United States Patent
Shiono

(10) Patent No.: US 9,933,593 B2
(45) Date of Patent: Apr. 3, 2018

(54) DRIVING APPARATUS AND OPTICAL DEVICE

(71) Applicant: CANON KABUSHIKI KAISHA, Tokyo (JP)

(72) Inventor: Masato Shiono, Hadano (JP)

(73) Assignee: Canon Kabushiki Kaisha, Tokyo (JP)

(*) Notice: Subject to any disclaimer, the term of this patent is extended or adjusted under 35 U.S.C. 154(b) by 199 days.

(21) Appl. No.: 14/935,751

(22) Filed: Nov. 9, 2015

(65) Prior Publication Data
US 2016/0149114 A1    May 26, 2016

(30) Foreign Application Priority Data

Nov. 25, 2014    (JP) .................. 2014-237401

(51) Int. Cl.
| | |
|---|---|
| *H01L 41/09* | (2006.01) |
| *G02B 7/02* | (2006.01) |
| *H02N 2/04* | (2006.01) |
| *G02B 7/08* | (2006.01) |
| *H02N 2/00* | (2006.01) |
| *H02N 2/02* | (2006.01) |

(52) U.S. Cl.
CPC .............. *G02B 7/08* (2013.01); *H02N 2/006* (2013.01); *H02N 2/026* (2013.01)

(58) Field of Classification Search
CPC ...... H02N 2/006; H02N 2/0026; H02N 2/026; G02B 7/08
USPC ............ 310/323.01, 323.02, 323.09, 323.13, 310/323.16, 323.17, 328
See application file for complete search history.

(56) References Cited

U.S. PATENT DOCUMENTS

| | | | | |
|---|---|---|---|---|
| 5,182,484 | A  * | 1/1993 | Culp ................. | F16D 65/18 310/328 |
| 5,900,691 | A  * | 5/1999 | Reuter ............... | H02N 2/0025 310/323.02 |
| 7,026,746 | B2 * | 4/2006 | Audren .............. | H02N 2/043 310/323.17 |
| 7,129,621 | B2 | 10/2006 | Sakano et al. | |
| 9,246,413 | B2 * | 1/2016 | Masuda ............. | H02N 2/0025 |
| 9,247,140 | B2 * | 1/2016 | Ohashi .............. | H02N 2/0055 |
| 2006/0066177 | A1 * | 3/2006 | Sugahara ........... | B65H 5/008 310/323.17 |

(Continued)

FOREIGN PATENT DOCUMENTS

| | | | | |
|---|---|---|---|---|
| JP | 2006-067712 A | | 3/2006 | |
| JP | 2016-201907 A | * | 4/2015 | .......... H02N 2/00 |
| WO | WO-2009/074152 A1 | * | 6/2009 | .......... G06F 17/50 |

*Primary Examiner* — Thomas Dougherty
(74) *Attorney, Agent, or Firm* — Fitzpatrick, Cella, Harper & Scinto

(57) ABSTRACT

A driving apparatus comprises a plurality of vibrators vibrating by application of a high-frequency voltage thereto; a friction member in frictional contact with the vibrators; and a pressing portion for bringing the vibrators into pressed contact with the friction member. The plurality of vibrators are arranged to be juxtaposed and a single drive force is extracted by moving the plurality of vibrators relative to the friction member, and a position where the drive force is extracted is a central position of the plurality of vibrators in a direction in which the plurality of vibrators are juxtaposed and is close to a frictional contact position in a pressing direction of the pressing portion.

12 Claims, 4 Drawing Sheets

(56) References Cited

U.S. PATENT DOCUMENTS

2012/0019104 A1* 1/2012 Yoshimura ........... H02N 2/0025
310/323.16
2016/0226402 A1* 8/2016 Morita ................. H02N 2/0075

* cited by examiner

DRIVING APPARATUS AND OPTICAL DEVICE

BACKGROUND OF THE INVENTION

Field of the Invention

The present invention relates to a driving apparatus used in an optical device or the like, more specifically, to a driving apparatus provided with a vibration wave motor.

Description of the Related Art

Conventionally, there have been vibration wave motors as examples of this type of driving apparatus. In the vibration wave motors, there has been conventionally known a technique for driving a sliding member relatively by bringing a vibrator, which vibrates periodically by application of a high-frequency voltage thereto, into pressed contact with a friction member. Further, there has been known a technique for generating a greater drive force by using a plurality of vibrators to drive a driving portion, in a case where a weight of driving portion is heavy, and the like.

The above mentioned prior art disclosed in Japanese Patent application Laid-Open No. 2006-067712 is configured in such a manner that vibrators are placed in both upper and lower sides of a friction member and power is transmitted to a lens mirror barrel that is desired to be driven, through a pin for extracting a drive force from end portions of the vibrators.

However, according to the above-mentioned configuration, a positional deviation between a portion (frictional contact surface of the vibrators) generating a drive force and an extracting portion of the drive force becomes large. When a position of the extracting portion of the drive force is away from the frictional contact surface of the vibrator, moment is generated on the vibrators due to a weight of a driven object (lens). Then, a frictional contact state of the vibrators is changed. Therefore, drive becomes unstable so that a stable drive force is hardly extracted.

SUMMARY OF THE INVENTION

An object of the invention is to provide a driving apparatus extracting a single drive force from a plurality of vibrators to be capable of extracting a stable drive force.

To solve the above-mentioned problem, the driving apparatus of the invention comprises: a plurality of vibrators vibrating by application of a high-frequency voltage thereto; a friction member in frictional contact with said vibrators; and a pressing portion for bringing said vibrators into pressed contact with said friction member, wherein said plurality of vibrators are arranged to be juxtaposed and a single drive force is extracted by moving said plurality of vibrators relative to said friction member, and wherein a position where said drive force is extracted is a central position of said plurality of vibrators in a direction in which said plurality of vibrators are juxtaposed and is close to a frictional contact position in a pressing direction of said pressing portion.

According to the invention, a driving apparatus that extracts a single drive force from a plurality of vibrators can extract the drive force stably.

Further features of the present invention will become apparent from the following description of exemplary embodiments with reference to the attached drawings.

DESCRIPTION OF THE EMBODIMENTS

Figure 1:
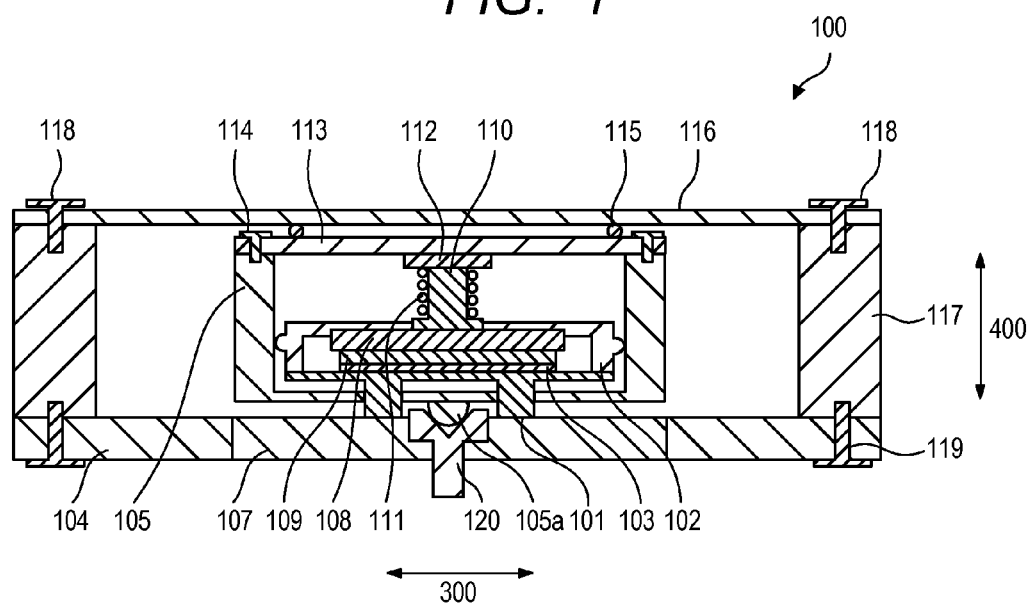
FIG. 1 is a main part cross sectional view illustrating a mechanism of a vibration wave motor according to embodiment 1 of the invention.

The following will describe each embodiment of the present invention in detail with reference to the accompanying drawings. In the drawings, the same components are denoted by the same reference numerals. Further, it is needless to say that each embodiment to be described below exemplifies the invention and the invention is not limited thereto. Furthermore, although a vibration wave motor is exemplified as a driving apparatus, it is not intended to exclude other type of driving apparatus.

Embodiment 1

Figure 2:
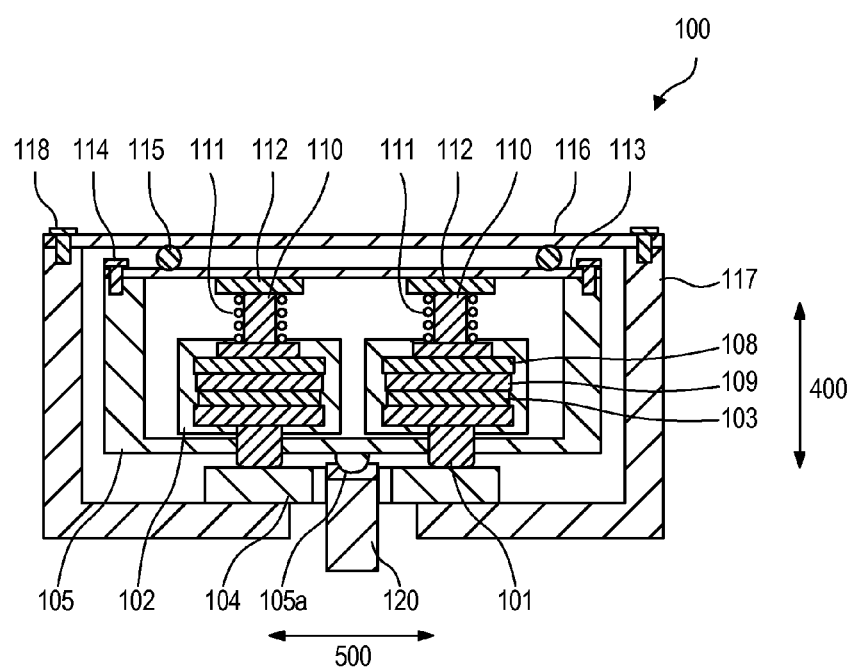
FIG. 2 is a cross sectional front view illustrating a mechanism of a vibration wave motor according to embodiment 1 of the invention.

FIG. 1 is a main part cross sectional view illustrating a mechanism of a vibration wave motor according to embodiment 1 of the invention. FIG. 2 is a cross sectional front view illustrating a mechanism of a vibration wave motor according to embodiment 1 of the invention. A linear vibration wave motor 100 is provided with a vibrating plate 101, which is fixed on a connecting member 102 by welding or publicly known glue.

Figure 3:
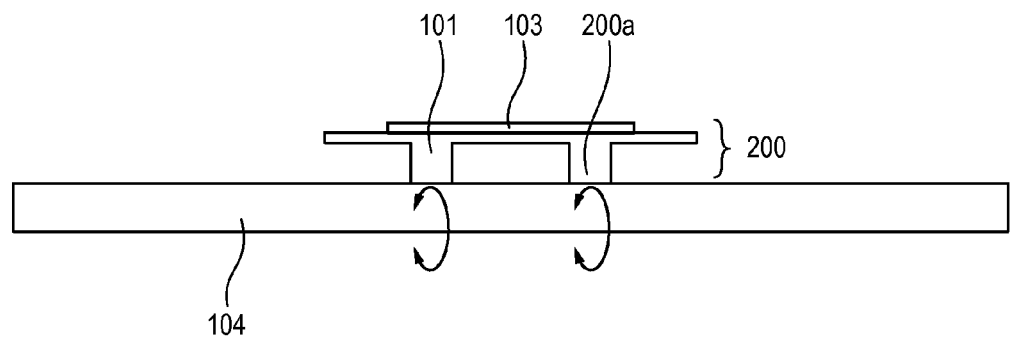
FIG. 3 is a main part enlarged view illustrating a friction member, a vibrator and elliptic vibration of a pressed contact portion of the vibrator upon application of a high-frequency voltage.

FIG. 3 is a main part enlarged view of a vibration wave motor 100, illustrating a friction member, a vibrator and elliptic vibration of a pressed contact portion of the vibrator upon application of a high-frequency voltage. A piezoelectric element 103 is fixed on the vibrating plate 101 by welding or publicly known glue and a vibrator 200 is formed by the vibrator 101 and the piezoelectric element 103. The vibrator 200 that vibrates by application of a high-frequency voltage to the piezoelectric element 103 is set to cause resonance. As a result, a tip of a pressed contact portion 200a formed at the vibrator 200 causes elliptic vibration illustrated in FIG. 3.

A rotational direction and a ratio of the major axis to the minor axis of the ellipse are properly changed by changing a frequency and a phase of a high-frequency voltage applied to the piezoelectric element 103 to generate desired motion. Accordingly, the vibrator 200 is contacted under pressure with and brought into frictional contact with a frictional member 104 serving as a mating component to generate drive force, so that the vibrator 200 itself is capable of moving back and force relative to the frictional plate 104 in a relative moving direction shown by an arrow 300 in FIG. 1. In the invention, two vibrators 200 are arranged to be juxtaposed in parallel in an arrangement direction shown by an arrow 500 in FIG. 2.

A support member 105 supporting the vibrators 200 is fixed, together with the connecting member 102 fixed on the above mentioned vibrators 200, at a mounting position. In this case, a plurality of vibrators 200 are supported by the single support member 105 so that a drive force generated by the plurality of vibrators 200 as a single motor is capable of being transmitted to a driving portion. Further, a pressing plate 108 bringing the vibrators 200 in pressed contact with the frictional member 104 pressingly holds the piezoelectric element 103 through an elastic member 109.

To provide to the pressing plate 108 an urging force for bringing the vibrators 200 into pressed contact with the friction member 104, a pressing spring 111, a retaining member 110 for retaining the pressing spring 111 and a pressing spring base plate 112 are provided. The retaining member 110 and the pressing spring base plate 112 are configured to be extendable and contractible in a pressing direction in a state where the pressing spring 111 is sandwiched therebetween.

Components of the pressing plate 108, an elastic member 109, the retaining member 110, the pressing spring 111, and the pressing spring base plate 112 constitute a pressing portion. With this configuration, the vibrators 200 are brought into pressed contact with the friction member 104. The pressing direction is shown by an arrow 400 in FIGS. 1 and 2.

A movable plate 113 is fixed on the supporting member 105 by screws 114. The movable plate 113 constitutes a part of a guide portion for guiding drive of the vibrators 200 back and force along the relative moving direction 300.

The movable plate 113 is provided with a V-shaped groove portion (not illustrated), in which balls 115 serving as rolling members are fitted. A cover plate 116 constituting a part of the guide portion is fixed on a base member 117 by screws 118. The cover plate 116 is provided with a V-shaped groove portion (not illustrated) at a position opposed to the groove portion of the movable plate 113. Balls 115 are sandwiched by the groove portion of the movable plate 113 and the groove portion of the cover plate 116 so that the support member 105 is supported to be movable back and force along the relative moving direction 300. The friction member 104 is fixed on a base member 117 by screws 119.

A single one of each of the support member 105, the movable plate 113, the cover plate 116 and the base member 117 mentioned above is provided. They are commonly used for the plurality of vibrators 200. With this configuration, each drive force obtained from the two vibrators 200 can be extracted as a single drive force through the commonly used support member 105. The extraction of a drive force will be described in detail.

With the configuration mentioned above, a vibration wave motor 100 using the plurality of vibrators 200, which is a diving apparatus according to the invention, is completed.

To extract a drive force, the support member 105 is provided with a projected portion 105a as illustrated in FIGS. 1 and 2. A connecting member 120 is connected with the projected portion 105a. The drive force generated at the projected portion 105a is transmitted to a unit holding an optical lens and the like through the connecting member 120. The projected portion 105a is formed at a central position of the vibrators 200 in the relative moving direction 300, namely at a central position of a drive force generating portion.

Further, the projected portion 105a is formed so as to be arranged in the center between the two vibrators 200 in an arrangement direction 500 of the two vibrators 200. Furthermore, in the pressing direction 400, a connecting position where the projected portion 105a is connected with the connecting member 120 is formed to be positioned at a position or level the same as or close to a frictional contact position between a pressed contact portion 200a formed on the vibrators 200 and a friction plate 104. Two or more vibrators 200 having a same shape as each other may be provided.

As mentioned above, an extracting position of the drive force is positioned at a central position of the vibrators 200 in the relative moving direction 300. Further, a drive force extracting position is positioned at a central position between the two vibrators 200 in the arrangement direction 500 of the vibrators 200 and at a position same as or close to the frictional contact position between the pressing portion 200a of the vibrators 200 and the friction member 104 in the pressing direction 400. With the configuration, the drive force can be extracted from a center of the drive force generating portion. Accordingly, no moment caused by a weight of a driven object (lens) is generated in the vibration wave motor 100 and drive becomes stable so that a drive force can be extracted stably.

Figure 4:
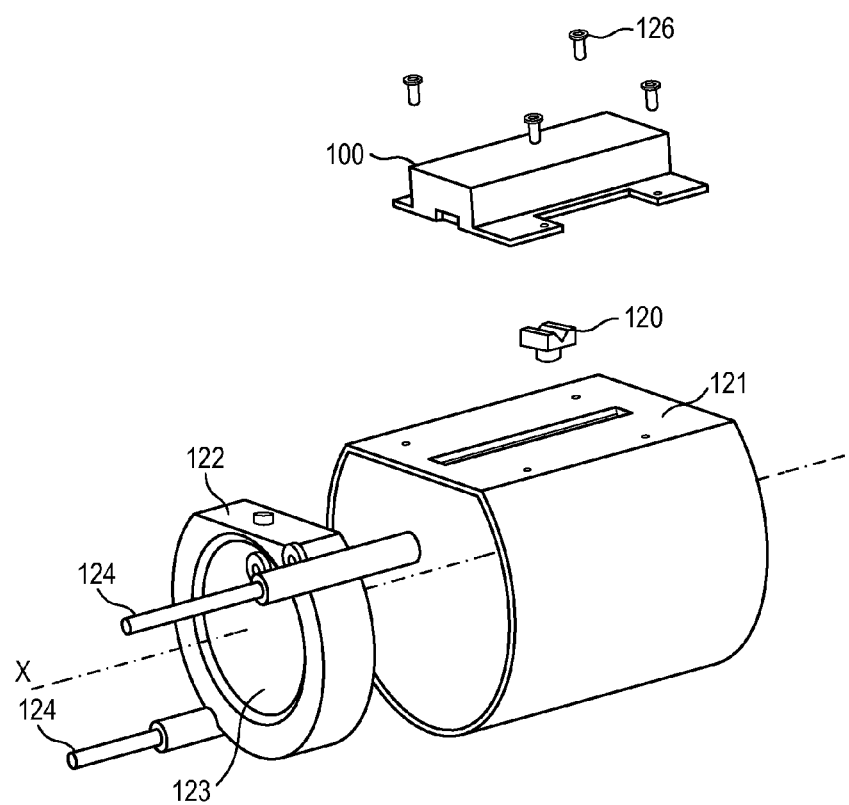
FIG. 4 is an exploded view illustrating a driving apparatus that drives linearly an optical lens with a vibration wave motor as a drive source according to embodiment 1 of the invention.

FIG. 4 is an exploded view illustrating a driving apparatus of the invention used as a drive source of the vibration wave motor 100 that drives linearly an optical lens of an optical device. In FIG. 4, a reference numeral 121 denotes a motor holding member, which holds the above mentioned vibration wave motor 100, and an optical lens, a guide bar and the like to be described below. The optical lens 123 is fixed on and held by a fitting portion of a lens holding member 122.

A guide bar 124 is fitted in a fitting hole in so that the lens holding member 122 is slidable relative to the guide bar 124. With this configuration, the lens holding member 122 is movable back and force in an optical axis X (relative moving) direction illustrated in FIG. 4. In the lens holding member 122, a connection holding portion is formed for holding the connecting member 120 and the connecting member 120 is incorporated therein. The vibration wave motor 100 is fastened by the motor holding member 121 and the screws 126.

In the incorporated state, the incorporation is made in such a manner that a tip engagement portion of the connecting member 120 is engaged with the projected portion 105a formed on the support member 105 so that a drive force generated by the oscillator wave motor 100 is transmitted to the lens holding member 122 through the connecting member 120. With this configuration, linear drive can be made possible in the optical axis (relative moving) direction of the lens holding member 122.

As described above, the extracting position of the drive force is arranged in the central position of each axis of the drive force generating sources so that the drive force can be extracted from the center of the drive force generating portions. Accordingly, no unwanted moment is exerted on the vibration wave motor 100 so that a drive force can be extracted stably without occurrence of backlash and bending. The lens holding member 122 desired to be driven can be moved back and forth in the relative moving direction by stable drive.

Embodiment 2

Embodiment 2 of the invention will be explained below. In the invention, a plurality of vibrators serving as drive force generating sources are utilized to constitute a single vibration wave motor 100. Accordingly, members that are commonly usable for the plurality of vibrators are made common, leading to reduction of the number of components and the assembling steps, and to improvement in assembling efficiency. Further, if a plurality of vibrators to be used are shaped the same, there are advantages in costs and management of components.

Figure 5A:
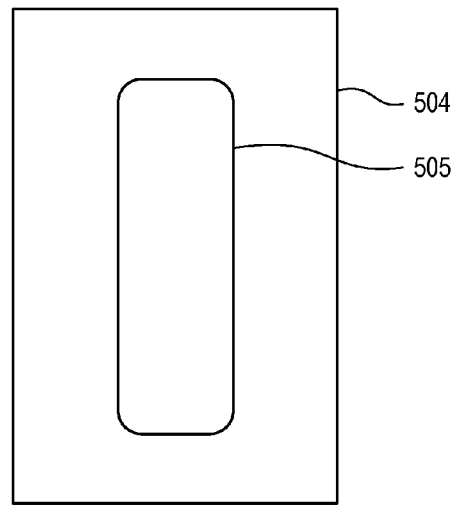
FIG. 5A is a view illustrating a configuration of a friction member to be used commonly for a plurality of vibrators according to embodiment 2 of the invention.

FIG. 5A is a view illustrating a shape of the friction member 504 for establishing motor drive with a single friction member to the plurality of vibrators 200. As described above, in order to extract a drive force from between the two vibrators 200 juxtaposed in parallel along the arrangement direction 500, it is necessary to provide the friction member 504 with an escape shape, which enables the connecting member 120 to be connected with the projected portion 105a of the support member 105.

In embodiment 2, a hole portion 505 is provided in the center of the friction member 504 to serve as the escape shape upon positioning the connecting member 120, as illustrated in FIG. 5A.

In the case where a plurality of identically shaped vibrators are used, drive frequencies for driving respective vibratos are substantially the same in value. Accordingly, to bring them into pressed contact with a common friction member to drive them, vibration generated at the friction member by a vibrator adversely affects drive of the other vibrator. For example, when the friction plate 504 is of symmetric shape with respect to the hole portion 505 as a center, resonance points of parts of the friction member 504 are the same at right and left sides so that if the plurality of vibrators are driven at a same frequency, they adversely affect each other.

Figure 5B:
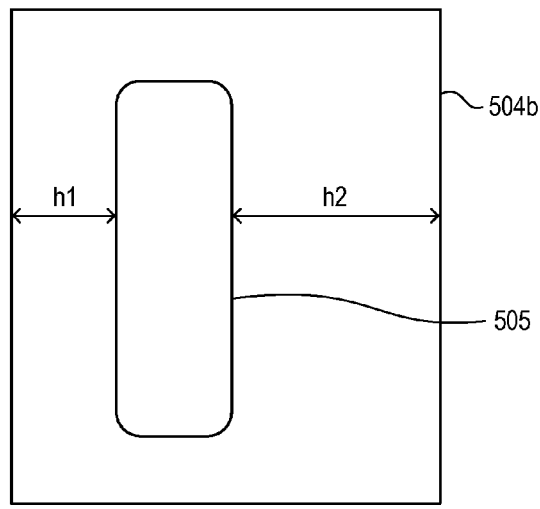
FIG. 5B is a view illustrating a friction member with different widths at right and left sides.

To solve this problem, shapes are varied at right and left sides with respect to the hole portion 505 of the friction member 504. FIG. 5B illustrates a friction member 504b made by the friction member 504 having widths varied at right and left sides with respect to the hole portion 505 as a center. A width h1 at the left side of the friction member 504b and a width h2 at the right side of the friction member 504b are deliberately varied (here, h1<h2) so that the resonance point at the left side of the friction member 504b is deviated from the resonance point at the right side thereof. With this configuration, even if the two vibrators are driven at a same drive frequency, they do not adversely affect each other.

Figure 5C:
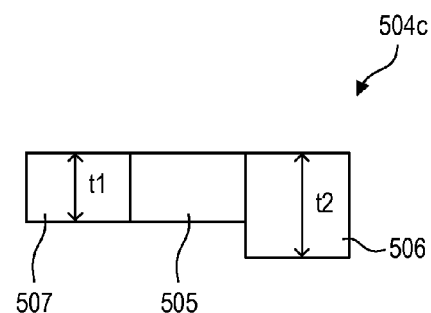
FIG. 5C is a view illustrating a friction member with different thicknesses at right and left sides.

Further, FIG. 5C illustrates a friction member 504c with a thickness t1 at a left side and a thickness t2 at a right side being varied (here, t1<t2). The thicknesses are varied at a left part 507 and a right part 506 that constitute both sides of the hole portion 505 so that the resonance point of the left side of the friction member 504c is deviated from that of the right side thereof, similarly.

Although it is exemplified that widths or thicknesses of the friction member 504 are varied at the right and left sides, apart from that, resonance points may be also deviated at the right and left sides by varying lengths of the friction member 504 at the right and left sides. Further, resonance points may be also deviated by using any combination of the above mentioned methods.

As described above, resonance points can be deviated at the left and right sides with respect to the hole portion 505 of the friction member 504 as a center, thereby eliminating adverse influence on the configuration that the friction member 504 is used commonly for the plurality of identically shaped vibrators. With the configuration, the number of components and assembling steps can be reduced, assembling efficiency can be improved and costs for components can be reduced.

Embodiment 3

Figure 6:
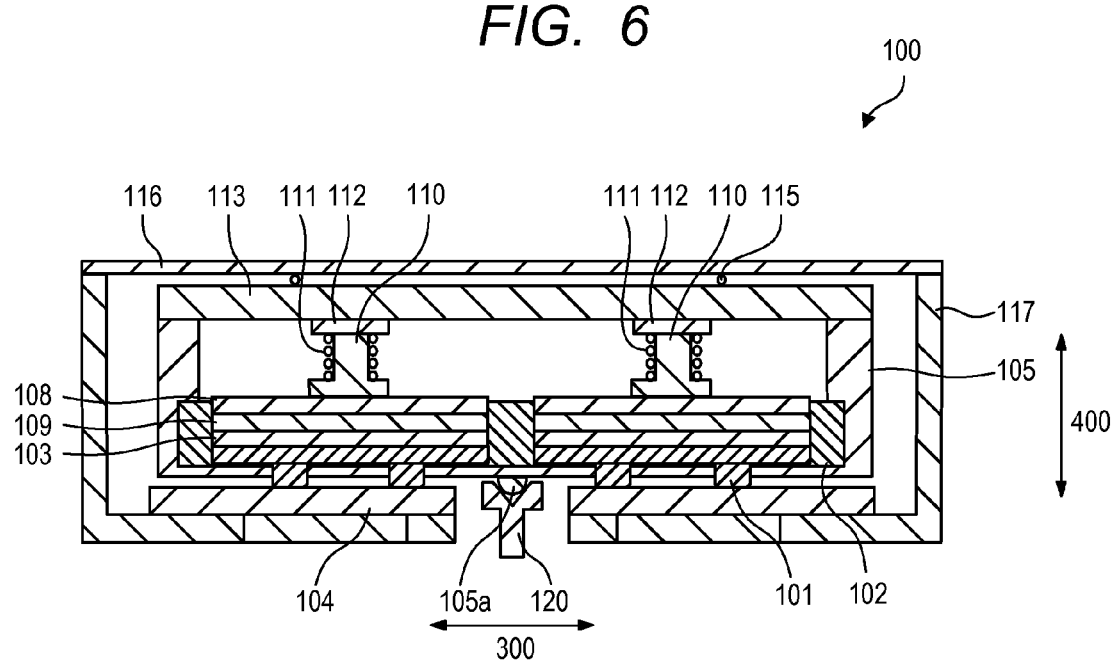
FIG. 6 is a main part cross sectional view illustrating a configuration in which vibrators are arranged in series according to embodiment 3 of the invention.

Embodiment 3 of the invention will be explained below. FIG. 6 is a main part cross sectional view illustrating a configuration in which vibrators are arranged in series along the relative moving direction, according to embodiment 3 of the invention. Vibrators 200 are arranged in series along the relative moving direction 300 so that a size of the vibration wave motor 100 can be reduced in a width direction. Accordingly, in a case of being mounted on specifically a lens mirror barrel or the like, a space is saved in a diameter direction so that the mirror barrel can be miniaturized. The relative moving direction 300 in this case is also a direction in which the plurality of vibrators are arranged.

When a drive range of each of the plurality of vibrators 200 arranged back and forth along the relative moving direction 300 can be narrowed, there may be an area where a pressed contact portion of the vibrators 200 is in no frictional contact with the friction member 104. In that case, in the area where the pressed contact portion of the vibrators 200 is in no frictional contact with the friction member 104 as illustrated in FIG. 6, the friction member 104 is divided into the front and the rear or is provided with an escape such as a hole or the like so that a drive force can be extracted from a frictional contact surface in the pressing direction 400.

Figure 7:
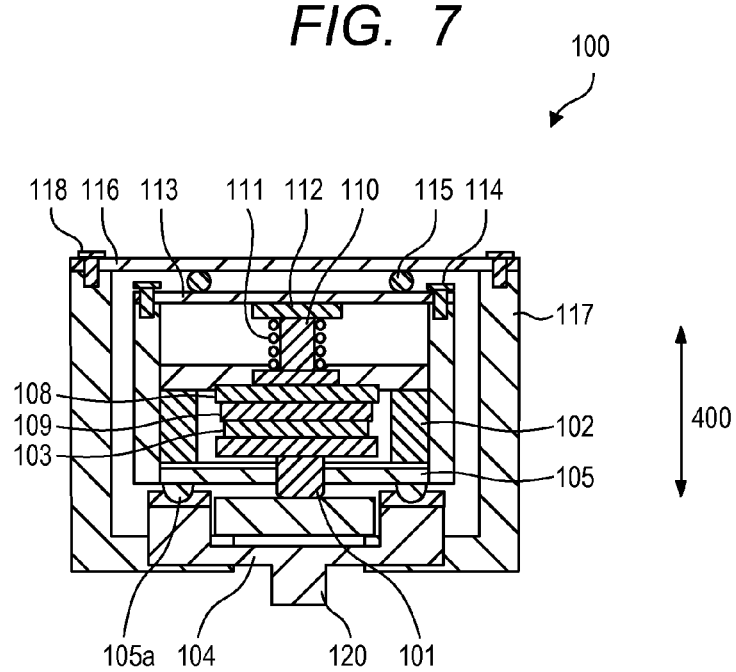
FIG. 7 is a cross sectional front view illustrating a configuration in which vibrators are arranged in series.

For extracting the drive force in a case where drive ranges of the vibrators 200 arranged at the front and the rear along the relative moving direction 300 are overlapped with each other, since the vibrators 200 are driven while the pressed contact portions of the vibrators 200 are in pressed contact with a center portion of the frictional member 104, it is impracticable to provide merely a hole shape. Accordingly, as illustrated in FIG. 7, projected portions 105a are configured to be provided at both sides of the support member 105. The connecting member 120 is connected with the projected portions 105a formed at the both sides so that a drive force can be extracted from the frictional contact surface in the pressing direction 400, thereby achieving incorporation without generating unnecessary moment.

While each embodiment of the invention has been described in detail as above, the invention is not restricted to above-mentioned embodiments, and the present invention may be applied to any configuration included within the scope of the appended claims. Further, for example, an ultrasonic wave motor in which a vibrating plate performs ultrasonic vibration may be used as a vibration wave motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-237401, filed Nov. 25, 2014, which is hereby incorporated by reference herein in its entirety.

What is claimed is:
1. A driving apparatus comprising:
a plurality of vibrators vibrating by application of a high-frequency voltage thereto, said plurality of vibrators each having a contact portion vibrating elliptically upon energization;

a friction member in frictional contact with each of said contact portions of said plurality of vibrators; and
a pressing portion for bringing said vibrators into pressed contact with said friction member,
wherein said plurality of vibrators are arranged to be juxtaposed and a single drive force is extracted by moving said plurality of vibrators relative to said friction member in a relative moving direction, and
wherein a position where the single drive force is extracted is a central position of said plurality of vibrators in a direction in which said plurality of vibrators are juxtaposed and is close to a level of a frictional contact position with respect to a pressing direction of said pressing portion.

2. A driving apparatus according to claim 1,
wherein said plurality of vibrators are arranged to be juxtaposed in parallel in the relative moving direction, and
wherein said friction member is constituted by a single member common to said plurality of vibrators and a hole portion for extracting the drive force is formed between said plurality of vibrators.

3. A driving apparatus according to claim 2,
wherein said friction member is different in at least one of width, thickness and length with respect to said hole portion as a center.

4. A driving apparatus according to claim 1, wherein said driving apparatus functions as a vibration wave motor.

5. A driving apparatus according to claim 4, wherein said vibrators are each provided with a vibration plate and a piezoelectric element.

6. A driving apparatus according to claim 4, wherein said vibration wave motor is an ultrasonic wave motor in which said vibrators cause ultrasonic vibration.

7. A driving apparatus comprising:
a first vibrator including a first contact portion vibrating elliptically upon energization;
a second vibrator arranged to be juxtaposed with said first vibrator, said second vibrator including a second contact portion vibrating elliptically upon energization; and
a support member for supporting said first vibrator and said second vibrator,
wherein said support member is capable of moving in a predetermined direction by vibration of said first vibrator and said second vibrator,
wherein said support member includes a connecting portion connectable with another member, and
wherein said connecting portion is arranged between a position where said first vibrator is arranged and a position where said second vibrator is arranged with respect to a direction in which said first vibrator and said second vibrator are juxtaposed.

8. A driving apparatus according to claim 7, wherein said first vibrator and said second vibrator are arranged to be juxtaposed in a direction orthogonal to the predetermined direction.

9. A driving apparatus according to claim 7, wherein said first vibrator and said second vibrator are arranged to be juxtaposed in a direction parallel to the predetermined direction.

10. A driving apparatus according to claim 7, further comprising:
a first pressing portion for generating pressure to be applied to said first vibrator; and
a second pressing portion for generating pressure to be applied to said second vibrator,
wherein said first pressing portion and said second pressing portion are arranged to be juxtaposed in the direction in which said first vibrator and said second vibrator are juxtaposed, and
wherein said connecting portion is arranged at a position between the position where said first pressing portion is arranged and the position where said second pressing portion is arranged, in the direction in which said first pressing portion and said second pressing portion are juxtaposed.

11. An optical device comprising:
a driving apparatus; and
a lens movable by said driving apparatus,
said driving apparatus including:
a plurality of vibrators vibrating by application of a high-frequency voltage thereto, said plurality of vibrators each having a contact portion vibrating elliptically upon energization;
a friction member in frictional contact with each of said contact portions of said plurality of vibrators; and
a pressing portion for bringing said vibrators into pressed contact with said friction member,
wherein said plurality of vibrators are arranged to be juxtaposed and a single drive force is extracted by moving said plurality of vibrators relative to said friction member in a relative moving direction, and
wherein a position where said drive force is extracted is a central position of said plurality of vibrators in a direction in which said plurality of vibrators are juxtaposed and is close to a level of a frictional contact position with respect to a pressing direction of said pressing portion.

12. An optical device comprising:
a driving apparatus; and
a lens movable by said driving apparatus,
said driving apparatus including:
a first vibrator including a first contact portion vibrating elliptically upon energization;
a second vibrator arranged to be juxtaposed with said first vibrator, said second vibrator including a second contact portion vibrating elliptically upon energization; and
a support member for supporting said first vibrator and said second vibrator,
wherein said support member is capable of moving in a predetermined direction by vibration of said first vibrator and said second vibrator,
wherein said support member includes a connecting portion connectable with another member, and
wherein said connecting portion is arranged between a position where said first vibrator is arranged and a position where said second vibrator is arranged with respect to a direction in which said first vibrator and said second vibrator are juxtaposed.

* * * * *